(12) United States Patent
Qian et al.

(10) Patent No.: US 10,757,138 B2
(45) Date of Patent: Aug. 25, 2020

(54) SYSTEMS AND METHODS FOR STORING A SECURITY PARAMETER INDEX IN AN OPTIONS FIELD OF AN ENCAPSULATION HEADER

(71) Applicant: Nicira, Inc., Palo Alto, CA (US)

(72) Inventors: Calvin Qian, San Jose, CA (US); Ganesan Chandrashekhar, Campbell, CA (US); Sanal Pillai, Sunnyvale, CA (US); Kishore Kankipati, Palo Alto, CA (US); Sujatha Sundararaman, San Jose, CA (US)

(73) Assignee: Nicira, Inc., Palo Alto, CA (US)

( * ) Notice: Subject to any disclaimer, the term of this patent is extended or adjusted under 35 U.S.C. 154(b) by 277 days.

(21) Appl. No.: 15/649,620

(22) Filed: Jul. 13, 2017

(65) Prior Publication Data

US 2019/0020684 A1    Jan. 17, 2019

(51) Int. Cl.
*G06F 21/00* (2013.01)
*H04L 29/06* (2006.01)

(52) U.S. Cl.
CPC ........ *H04L 63/164* (2013.01); *H04L 63/0272* (2013.01); *H04L 63/102* (2013.01); *H04L 63/166* (2013.01); *H04L 63/205* (2013.01); *H04L 63/06* (2013.01); *H04L 63/10* (2013.01)

(58) Field of Classification Search
CPC ... H04L 63/164; H04L 63/166; H04L 63/102; H04L 63/205; H04L 63/10; H04L 63/06
USPC ........................................................ 713/153
See application file for complete search history.

(56) References Cited

U.S. PATENT DOCUMENTS

| | | | |
|---|---|---|---|
| 7,434,045 B1* | 10/2008 | Enderwick | H04L 63/06 713/158 |
| 10,103,902 B1* | 10/2018 | Sampath | H04L 12/467 |
| 2007/0180227 A1* | 8/2007 | Akimoto | H04L 63/0464 713/153 |
| 2008/0019525 A1* | 1/2008 | Kruegel | H04L 63/0428 380/273 |
| 2008/0075073 A1* | 3/2008 | Swartz | H04L 63/162 370/389 |
| 2013/0103940 A1* | 4/2013 | Badea | H04L 43/50 713/160 |
| 2015/0295899 A1* | 10/2015 | Chen | H04L 63/0428 713/160 |
| 2017/0063808 A1* | 3/2017 | Manapragada | H04L 67/2804 |
| 2017/0085502 A1* | 3/2017 | Biruduraju | H04L 49/354 |
| 2017/0295019 A1* | 10/2017 | Fukuda | H04L 9/3226 |
| 2018/0139123 A1* | 5/2018 | Qiang | H04L 45/308 |

OTHER PUBLICATIONS

"Encapsulation Techniques: Generic Network Virtualization Encapsulation, VXLAN Generic Protocol Extension, and Network Service Header" (2014), Cisco. p. 1-3 (Year: 2014).*

* cited by examiner

*Primary Examiner* — Shewaye Gelagay
*Assistant Examiner* — Kevin Ayala
(74) *Attorney, Agent, or Firm* — Patterson + Sheridan, LLP (57) ABSTRACT

Certain embodiments described herein are generally directed to a first host machine exchanging a Security Parameter Index (SPI) value with a second host machine by storing the SPI in an options field of an encapsulation header of an encapsulated packet.

25 Claims, 6 Drawing Sheets

```
┌─────────────────────────────────────────────────────────────────┐
│ ENCAPSULATE A DATA PACKET USING THE GENEVE ENCAPSULATION        │ ⟶ 510
│                        PROTOCOL                                  │
└─────────────────────────────────────────────────────────────────┘
                                │
                                ▼
┌─────────────────────────────────────────────────────────────────┐
│ STORE AN SPI VALUE CORRESPONDING TO THE DATA PACKET IN A GENEVE │ ⟶ 520
│        HEADER OF THE GENEVE ENCAPSULATED DATA PACKET             │
└─────────────────────────────────────────────────────────────────┘
                                │
                                ▼
┌─────────────────────────────────────────────────────────────────┐
│    ENCRYPT THE GENEVE ENCAPSULATED DATA PACKET USING THE         │ ⟶ 530
│          ENCAPSULATION SECURITY PROTOCOL (ESP)                   │
└─────────────────────────────────────────────────────────────────┘
                                │
                                ▼
┌─────────────────────────────────────────────────────────────────┐
│   TRANSMIT THE GENEVE ENCAPSULATED ESP ENCRYTED PACKET TO A      │ ⟶ 540
│                    DESTINATION ENDPOINT                          │
└─────────────────────────────────────────────────────────────────┘
```

SYSTEMS AND METHODS FOR STORING A SECURITY PARAMETER INDEX IN AN OPTIONS FIELD OF AN ENCAPSULATION HEADER

BACKGROUND

Software defined networking (SDN) comprises a plurality of hosts (e.g., endpoints) in communication over a physical network infrastructure, each host having one or more virtualized computing instances such as virtual machines (VMs) or containers that are connected to one another over logical overlay networks that are decoupled from the underlying physical network infrastructure. SDN may utilize distributed network encryption ("DNE"), which is a functionality created within the SDN framework to simplify key management associated with IP Security (IPSec). Using DNE, each endpoint within a network of endpoints receives or derives security parameter index (SPI) values, used to identify a corresponding security association established with other endpoints, as well as encryption/decryption keys to utilize in exchanging data packets with other endpoints in the network in an IPSec secured manner. For example, data packets may be encrypted at a source endpoint using a symmetric encryption/decryption key, transmitted to a destination endpoint, and decrypted at the destination endpoint using the same encryption/decryption key. In some cases, an SPI value is stored in an IPSec header of a data packet when the data packet is being encrypted at the source endpoint using the encapsulating security payload (ESP) protocol. After receiving the encrypted packet, the destination endpoint may extract the SPI value from the IPSec header and use it to identify a security association that stores the encryption/decryption key that the data packet was encrypted with at the source endpoint. In some cases, however, after the destination endpoint decrypts the data packet using the encryption/decryption key, it strips the IPSec header off the packet. This may then leave other modules in the operating system environment of the destination endpoint without access to the SPI value and, therefore, unable to perform some functionalities.

SUMMARY

Herein described are one or more embodiments of a method for use by a first host machine for exchanging a Security Parameter Index (SPI) value with a second host machine. The method includes encapsulating, by the first host machine, a data packet using an encapsulation frame format with an encapsulation header that includes an options field. The method also includes storing, by the first host machine, the SPI value corresponding to the data packet in the options field of the encapsulation header of the data packet. The method also includes encrypting, by the first host machine, the data packet using one or more security protocols and storing the SPI value in a security protocol header of the data packet. The method also includes transmitting, by the first host machine, the data packet to the second host machine.

Also described herein are embodiments of a non-transitory computer readable medium comprising instructions to be executed in a computer system, wherein the instructions when executed in the computer system perform the method described above for use by a first host machine for exchanging a Security Parameter Index (SPI) value with a second host machine.

Also described herein are embodiments of a computer system, wherein software for the computer system is programmed to execute the method described above for use by a first host machine for exchanging a Security Parameter Index (SPI) value with a second host machine.

Also described herein are embodiments of a computer system comprising means for executing the method described above for use by a first host machine for exchanging a Security Parameter Index (SPI) value with a second host machine.

DETAILED DESCRIPTION

Embodiments presented herein relate to systems and methods for storing an SPI value in an options field of an encapsulation (e.g., Geneve) header of a packet.

Figure 1:
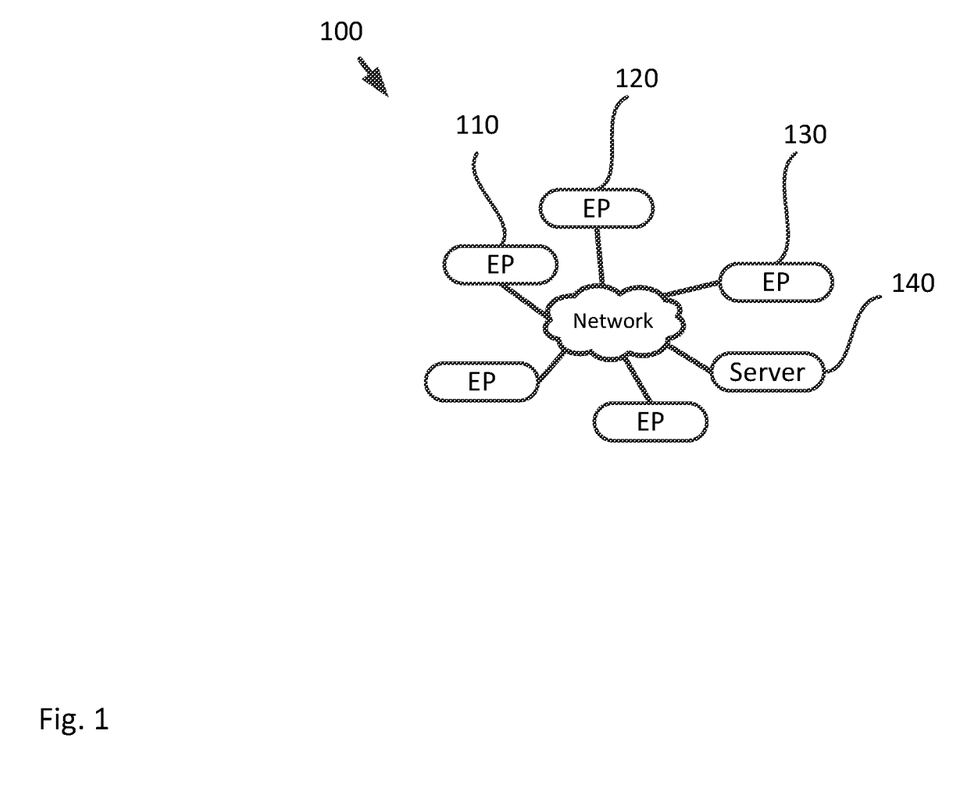
FIG. 1 illustrates an example of a network, in accordance with some embodiments.

FIG. 1 illustrates an example of a network 100. In certain embodiments, network 100 represents a physical network. As shown by FIG. 1, network 100 connects a plurality of endpoints (EPs), including EP 110, EP 120, and EP 130. An EP refers generally to an originating EP ("source EP") or terminating EP ("destination EP") of a flow of network packets, which can include one or more data packets passed from the source to the destination EP. In practice, an EP may be a physical computing device (e.g., physical server, physical host). In certain embodiments, the EP may be configured to host one or more virtualized computing instances (e.g., virtual machine, container, data compute node, isolated user space instance) as further discussed herein.

In a network, EPs may communicate with or transmit data packets to other EPs. For instance, EP 110 may transmit data packets to EP 120 in a secured fashion, such as by utilizing IP Security (IPSec) protocols. However, in some embodiments, before any data can be securely transferred using the IPSec framework, security associations may need to be established between the two EPs. In some embodiments, each security association is a one-way or simplex connection, and therefore at least two security associations, one for each direction, are established between two IPSec peers (e.g., EPs). These security associations are a form of contract between the EPs detailing how to exchange and protect information among each other. In some embodiments, each security association is comprised of a mutually agreed-upon key, one or more security protocols, and/or an SPI value.

The mutually agreed-upon key (e.g., encryption/decryption key), in some embodiments, is generated by a server (e.g., server 140) and subsequently distributed to EPs. Also, the one or more security protocols, described above, may be one or more IPSec security protocols such as Authentication Header (AH), Encapsulating Security Payload (ESP), etc., as further described in relation to FIG. 2. After security associations have been established between two IPSec peers, one or more of these security protocols may be used to protect data packets for transmission. Though certain embodiments are described herein with respect to the ESP security protocol, other suitable IPSec security protocols (e.g., AH protocol) may, either in combination with ESP or alone, be used in accordance with the embodiments described herein.

In addition to a mutually agreed-upon key and security protocol, a security association includes an SPI value. In some embodiments, each SPI value is a binary value associated with a security association, which enables an EP to distinguish among multiple active security associations. As an example, SPI values may be used to distinguish between the inbound and outbound security associations running on an EP. In some cases, the Internet Key Exchange (IKE) protocol is used to generate these SPI values and encryption/decryption keys in the IPSec framework. For example, prior to any data exchange, IKE performs a two-phase negotiation session, which results in establishing two security associations between two IPSec peers. These security associations may not only contain mutually agreed-upon encryption and decryption keys to be used for incoming and outgoing traffic, but also maintain sequence numbers for each data transfer. These sequence numbers are maintained to ensure anti-replay, which prevents hackers from injecting or making changes in data packets that travel from a source to a destination EP. However, if the IKE protocol is used to establish these security associations in a network with, for instance, (N) number of hosts, then each host may need to set up (N−1) IKE negotiation sessions.

Accordingly, in some cases, instead of using IKE, DNE may be utilized to simplify key management, including key generation and exchange, and SPI allocation. DNE provides a central unit, e.g. server 140, that generates and distributes encryption/decryption keys and SPI values to EPs in a network. DNE also simplifies protecting network traffic of EPs (e.g., virtual machines running on EPs) by allowing users (e.g., network administrators) to define simple security rules and key policies. For example, in some embodiments, server 140 may store, in its memory, a plurality of security rules and key policies. Security rules may be user-defined rules that users input into the central unit through an interface (e.g., via a manager, which may be a physical computing device or a virtualized computing instance supported by a physical computing device). Security rules may define what key policy is used by server 140 to generate an encryption/decryption key for data transfer between EPs in a network. In some embodiments, each key policy may be associated with one or more EPs and include certain specifications (e.g., one or more of an algorithm, action, strength of the key, etc.) that define properties of an encryption/decryption key.

As described above, IPSec may use the ESP protocol to provide data confidentiality (encryption) and authentication (data integrity, data origin authentication, and replay protection) services to EPs in their transmission of IP packets to one another. Accordingly, as described in relation to FIG. 2 below, a source EP may, in some embodiments, use the ESP protocol to encrypt an original IP packet and thereby protect the confidentiality of data carried by the IP packet and enable verification of its authenticity by the destination EP (i.e., the receiver of information).

In general, prior to the application of the ESP protocol, or other security protocols, each original IP packet may include an IP header and IP payload (or data). An IP header is header information at the beginning of an original IP packet, which contains information about the IP version (IPv4, IPv6, etc.), IP protocol, source IP address, destination IP address, etc. The IP protocol field of the IP header indicates the next higher layer protocol being carried as the IP payload. For example, an IP protocol field having an IP protocol type code or value of six indicates that the IP payload is a Transmission Control Protocol (TCP) segment. The TCP segment includes a TCP header and TCP payload. The TCP header includes source and destination port values. In another example, an IP protocol field having an IP protocol type value of seventeen indicates that the IP payload is a User Datagram Protocol (UDP) datagram. The UDP datagram includes a UDP header and UDP payload. The UDP header includes source and destination port values. In addition to the IP header, as described above, an original IP packet also includes an IP payload field, which is the data or message within the original IP packet that is intended for the receiver (e.g. a destination EP).

In the process of applying ESP to an IP packet, the original IP packet may be modified. More specifically, the source EP may reconstruct outbound IP packets with additional IPSec headers. Once received by the destination EP, the inbound IP packets may be stripped of their IPSec headers. In some embodiments, the manner in which the source EP modifies or reconstructs the original IP packet depends on the mode used. There are two ESP modes, which are transport and tunnel modes.

Figure 2:
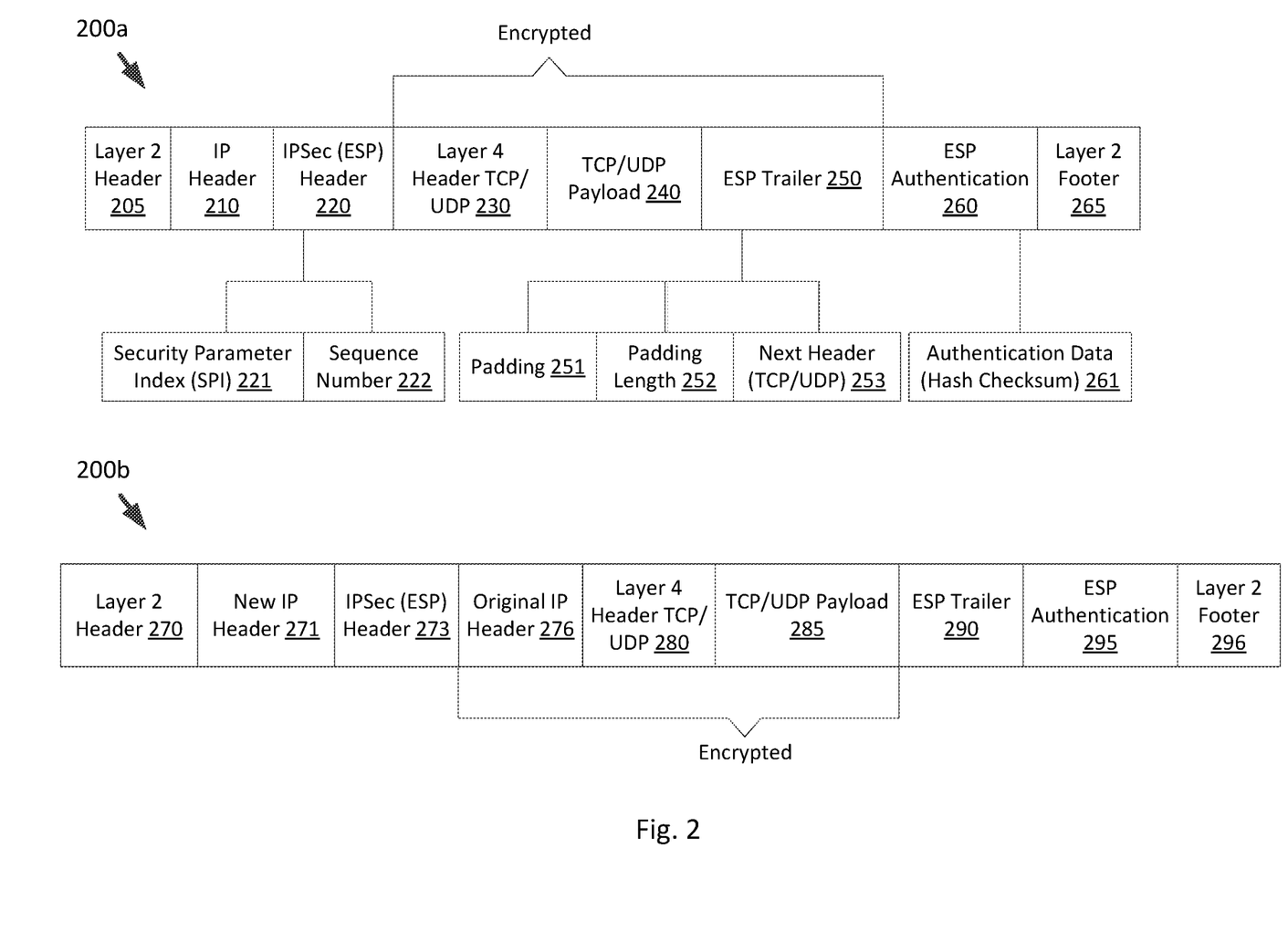
FIG. 2 illustrates an example of an ESP encrypted data packet, in accordance with some embodiments.

FIG. 2 first illustrates ESP packet 200*a*, an example of an IPv4 packet encrypted by the ESP protocol using the transport mode, in accordance with some embodiments. ESP packet 200*a* includes Layer 2 header 205, IP header 210, IPSec (ESP) header 220, Layer 4 header TCP/UDP 230, TCP/UDP payload 240, ESP trailer 250, ESP authentication 260, and Layer 2 footer 265. Using the transport mode of the ESP protocol, the value of the IP protocol field of the original IP header of the IPv4 packet may be changed to fifty to indicate encryption using ESP. The changed IP header is shown as IP header 210 of ESP packet 200*a*. IPSec ESP header 220 is then placed after IP header 210 of ESP packet 200*a*. As shown in FIG. 2, IPSec ESP header 220 further includes SPI value 221 as well as sequence number 222, whose functionalities were described above. Subsequent to placing ESP header 220 after IP header 210, the IP payload of the original IP packet may be encrypted using an encryption/decryption key received, in some embodiments, from a server (e.g., server 140), as described above. For example, where the IP payload of the original data packet is a TCP segment or UDP datagram, the header (with source and destination port values) and payload of the TCP segment or UDP datagram may be encrypted. The result may be encrypted Layer 4 header TCP/UDP 230 (with encrypted source and destination port values) and encrypted TCP/UDP payload 240.

Following TCP/UDP payload 240 is ESP trailer 250, which is appended to the IP payload of the original IP packet and is also encrypted. ESP trailer 250, as shown in FIG. 2, comprises padding 251, padding length 252, and next header (TCP/UDP) 253. Padding 251 is a 0-255 byte field used for encryption or alignment. Padding length 252 indicates the length of padding 251 in bytes. In addition, next header (TCP/UDP) 253 identifies the nature of the payload, such as whether it is a TCP segment or a UDP datagram. ESP packet 200*a* also includes ESP authentication 260, containing an Integrity Check Value (ICV) and authentication data (hash checksum) 261, used to verify the identity of the sender (e.g. source EP) and the integrity of the message.

ESP packet 200*a* also includes Layer 2 header 205 and Layer 2 footer 265. In certain embodiments, Layer 2 header 205 includes a source media access control (MAC) address of the source EP and a destination MAC address of the next-hop in the network for ESP packet 200*a*. In addition, Layer 2 footer 265 includes error detection information that allows the destination EP to determine whether the packet includes an error.

As described above, an ESP packet may be generated using one of two modes, including transport and tunnel modes. In contrast to the transport mode, instead of using the original IP header (e.g., IP header 210) for routing, the tunnel mode may encapsulate the original IP packet and build a new IP header, containing the source and destination IP addresses of the EPs for routing the ESP packet. FIG. 2 shows ESP packet 200*b*, an example of an ESP packet encrypted and encapsulated using the tunnel mode. ESP packet 200*b*, as shown, includes the following fields: Layer 2 header 270, new IP header 271, IPSec ESP header 273, the original IP header 276, Layer 4 header TCP/UDP 280, TCP/UDP payload 285, ESP trailer 290, ESP authentication data 295, and Layer 2 footer 296. Also, similar to an IPv4 packet, an IPv6 packet may also be encapsulated using the ESP protocol.

In some embodiments, after a data packet (e.g., IPv4, IPv6, etc.) is encrypted at a source EP using the ESP protocol (or ESP protocol in combination with the AH protocol), it is then transmitted by the source EP to a destination EP over a network (e.g. network 100).

In some embodiments, the destination EP is a physical computing device, as further described in relation to FIG. 3 below, that operates a firewall (e.g., in a virtual switch in a kernel space of its operating system). The virtual switch implementing the firewall performs policy enforcement by monitoring and controlling inbound data packets (e.g., ESP packet 200*a*, ESP packet 200*b*, etc.) based on a set of security policies. It should be noted that though the firewall is described as being implemented in the virtual switch, it may be implemented external from the virtual switch in the physical computing device, such as somewhere before or after the virtual switch along a processing pipeline of the physical computing device for processing inbound data packets. Also, in order to receive and process IPSec secured packets (e.g., ESP packet 200*a* or ESP packet 200*b*) from the source EP, in some embodiments, the destination EP integrates the IPSec protocol in the network layer of its kernel space.

In some embodiments, on the receipt of the ESP packet, such as ESP packet 200*a*, the network layer of the destination EP's kernel extracts SPI value 221 from IPSec ESP header 220 as well as the source and the destination IP addresses and protocol from IP header 210. Using SPI value 221, the network layer then fetches a relevant security association, if any, from a security association database stored in the memory of the destination EP. The fetched security association contains the encryption/decryption key that the ESP packet was encrypted with. Using this encryption/decryption key, in some cases, the network layer decrypts the TCP/UDP payload 240, after which the network layer then strips off IPSec ESP header 220 and passes the remainder of ESP packet 200*a* to the virtual switch.

However, in some embodiments, in order for the virtual switch implementing the firewall to perform policy enforcement, it requires access to SPI value 221 stored in IPSec ESP header 220. This is because, some of the security policies that the virtual switch implementing the firewall may use to control the inbound ESP packet 200*a* are based on the type of encryption used to encrypt ESP packet 200*a* at the source EP. Therefore, without SPI value 221, the virtual switch implementing the firewall may not be able to identify the encryption key that was used to encrypt ESP packet 200*a* and, therefore, may not be able to determine if ESP packet 200*a* matches one of the security policies stored in the memory resources of the destination EP.

Accordingly, certain embodiments described herein relate to utilizing the General Network Virtualization Encapsulation (Geneve) frame format to store and carry SPI value 221 to the virtual switch implementing the firewall even after the IPSec ESP header is stripped off. Geneve is a generic and extensible encapsulation protocol designed to offer control-plane independence between tunnel endpoints in a virtualized network environment. This frame format, as further described in relation to FIG. 4, allows for current and future network implementations to carry metadata encoded in a Type-Length-Value (TLV) format as option headers. Though certain embodiments are described herein with respect to the Geneve frame format, other suitable encapsulation frame formats that include an options field or other suitable field for storing and carrying SPI value 221 may be used in accordance with the embodiments described herein.

Figure 3:
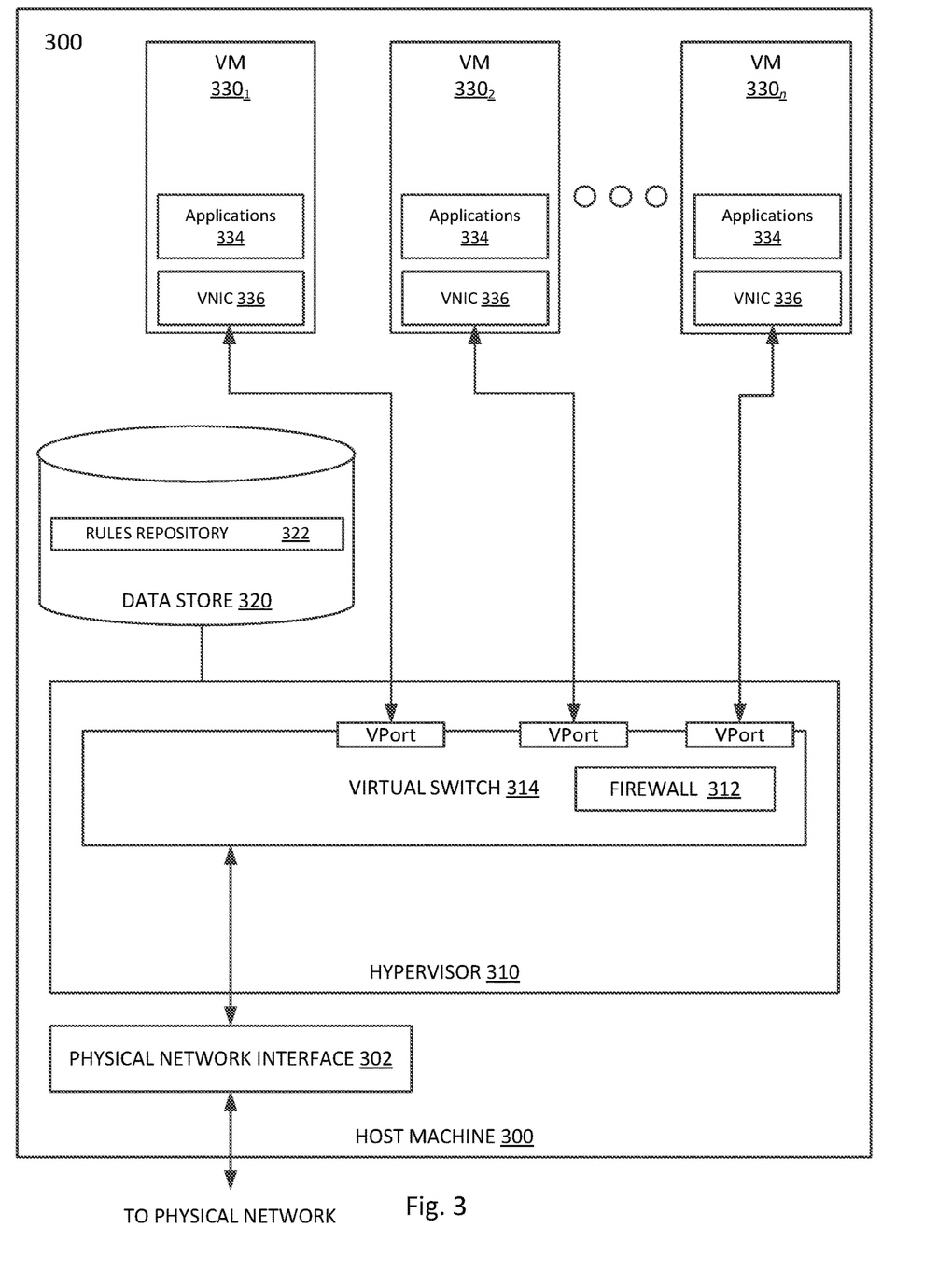
FIG. 3 illustrates an example block diagram of host machine (e.g., a source/destination EP) for use in a virtualized network environment, according with some embodiments.

FIG. 3 illustrates an example block diagram of host machine 300 (e.g., a source/destination EP) for use in a virtualized network environment, according to some embodiments. In some embodiments, host machine 300 may be a source EP utilized to generate a Geneve encapsulated packet and store an SPI value therein for transmission to a destination EP. As illustrated, host machine 300 includes a physical network interface controller (PNIC) 302, a hypervisor 310, a data store 320, and a plurality of virtual machines 330. Hypervisor 310, in some embodiments, operates in the kernel space of an operating system residing on host machine 300. In some embodiments, the operating system is a Linux operating system and hypervisor 310 is a Kernel Virtual Machine (KVM). KVM is a virtualization infrastructure for the Linux kernel.

Host machine 300 may provide part of the computing infrastructure in a virtualized computing environment distributed among multiple host machines. Though certain embodiments are described herein with respect to VMs, the same principals and techniques may also apply to other appropriate virtual computing instances (e.g., virtual machine, container, data compute node, isolated user space instance). In certain embodiments, host machine 300 is a hardware computing platform (e.g., a server). Each hardware computing platform may include (not shown) one or more central processing units (CPUs), system memory, and non-volatile data storage. The host machine 300 further includes one or more network interfaces, such as PNIC 302, for communicating with other hardware computing platforms within host machine 300 and/or network destinations outside of host machine 300.

Host machine 300, as illustrated, has access to a physical network (e.g. network 100 of FIG. 1) through PNIC 302. Through the physical network, host machine 300 is able to communicate with other host machines. For example, if host machine 300 is a destination EP, it is able to receive and process data packets from a source EP through the physical network. In addition, as described above, host machine 300 may implement the IPSec protocol in its kernel space, which also enables it to process IPSec secured data packets (e.g., ESP packet 200a or ESP packet 200b) received from a source EP.

Hypervisor 310, as illustrated, includes a virtual switch 314 that implements a firewall 312. In alternate embodiments, virtual switch 314 and firewall 312 may execute in a privileged virtual machine (not shown). Such privileged virtual machines are often referred to variously as a "Domain zero," "root-partition," or "parent-partition." In some embodiments, firewall 312 is outside of virtual switch 314 (e.g., before or after virtual switch 314 along a processing pipeline for data packets in host machine 300). In some such embodiments, SPI value information may be extracted from the Geneve header and passed to the firewall 312 for enforcing firewall rules. Hypervisor 310 serves as an interface between guest virtual machines 330 and PNIC 302, as well as other physical resources available on host machine 300. Each virtual machine 330 includes a virtual network interface card (VNIC) 336 which is responsible for exchanging packets between virtual machine 330 and hypervisor 310. VNICs 336 may be, in some cases, a software abstraction of a physical network interface card. Each virtual machine 330 is connected to a virtual port (vport) provided by virtual switch 314 through the VM's associated VNIC 336. Virtual switch 314 may serve as physical network switch, i.e., serve as an edge device on the physical network, but implemented in software. Virtual switch 314 is connected to PNIC 302 to allow network traffic to be exchanged between virtual machines 330 executing on host machine 300 and destinations on an external physical network. Accordingly, virtual machines 330 may be interconnected as part of a logical overlay network. Logical overlay networks may be implemented by an EP by encapsulating egress packets from the virtual machines and decapsulating ingress packets. For example, Virtual Extensible Local Area Network (VXLAN) tunnel endpoint (VTEP) services for encapsulating packets (e.g., Geneve packet, VXLAN packet, etc.) may be implemented in software by the virtual switch 314 (or outside of virtual switch 314 and functionally coupled to virtual switch 314 using forwarding tables), as further described below.

While hypervisor 310 is illustrated as including virtual switch 314, it should be recognized that hypervisor 310 may additionally expose virtual ports to one or more virtual machines 330 using a virtual router or other virtual networking infrastructure provided by hypervisor 310. In some embodiments, an example of virtual switch 314 is the Open vSwitch (OVS), which is an open-source implementation of a distributed multi-layer switch. The OVS provides a switching stack for hardware virtualization environments, such as KVM.

In some embodiments, firewall 312 operates in a kernel space of hypervisor 310 and monitors virtual ports provided by infrastructure components (e.g., virtual switch ports of virtual switch 314, virtual router ports, and so on) in host machine 300 for the establishment of new connections between a virtual machine 330 and a virtual port. As described above, firewall 312 implements security rules that define, for example, network destinations that applications 334 executing in a VM 330 are allowed to communicate with, network destinations that are blocked from communicating with the VM 330, and so on. In some embodiments, these security rules are stored in rules repository 322 of data store 320 and may be enforced as rules generated by a system administrator and applied to the appropriate VM 330 by firewall 312. In certain embodiments, security rules for one or more host machines that are stored in respective rules repositories 322 may be configured and received from a central controller (not shown) that configures security rules and distributes them to host machines. In certain embodiments, firewall 312 follows the OVS OpenFlow protocol. OpenFlow is a communications protocol that gives access to the forwarding plane of a network switch (e.g., OVS) over the network.

As described above, host machine 300 may be a destination EP that receives an ESP packet (e.g., ESP packet 200a) from a source EP. However, as also described above, when processing the ESP packet, the IPSec protocol within the network layer in the kernel space of host machine 300 decrypts and strips off the IPSec ESP header (e.g., IPSec ESP header 220). This prevents other modules (e.g., firewall 312) in the kernel space of the operating system from having access to the information (e.g., SPI value, etc.) stored in the IPSec ESP header, unless the kernel space is configured to share the SPI value with other modules. For example, in some cases, modules in the kernel space (e.g., network layer of the destination EP and firewall 312) may be modified to share the SPI value with each other.

However, configuring the kernel in certain environments (e.g., open-source environments, such as the KVM), may not be feasible. Accordingly, as described above, a data packet may first be encapsulated (e.g., by a VTEP implemented by virtual switch 314 or coupled to virtual switch 314) using the Geneve encapsulation protocol, while saving the SPI value in an options field (e.g., Geneve option 441 in Geneve variable length options field 440 of FIG. 4) of the Geneve header (e.g., Geneve header 430 of FIG. 4), and then further encrypted using the ESP protocol. As described above, in some embodiments, Geneve encapsulation is performed by a VTEP implemented by or coupled to virtual switch 314 (e.g., referred to as an edge VTEP or hypervisor-based VTEP). While the term "VTEP" refers to "VXLAN" tunneling protocol, it is now often used regardless of the tunneling protocol.

For example, a source virtual machine (e.g., VM $330_1$) on a source EP may generate an IP/MAC packet (e.g., the original IP packet, as described in relation to FIG. 2 or the Layer 2 frame of FIG. 4) with the address (e.g., MAC address and/or IP address) of the source virtual machine set as the source address and the address (e.g., MAC address and/or IP address) of the destination virtual machine on a different destination EP set as the destination address. The source virtual machine may send the packet to a virtual switch (e.g., virtual switch 314) implemented in the source EP. The virtual switch may implement a VTEP (e.g., source VTEP), which encapsulates the packet received from the source virtual machine to generate a Geneve encapsulated packet. The original packet may be referred to as an inner packet, and the encapsulated packet may be referred to as an outer packet. Further, a header of the inner packet including the address of the source virtual machine set as the source address and the address of the destination virtual machine set as the destination address may be referred to as an inner header. The source VTEP may further include an outer header as part of the outer packet. The outer header may include a source address of the source VTEP generating and transmitting the encapsulated packet, and further may include a destination address of a VTEP (e.g., destination VTEP) associated with the destination virtual machine. The source VTEP implemented by virtual switch 314 passes the encapsulated packet to the network layer of the source EP, which encrypts the packet utilizing ESP protocol. Accordingly, in the overlay network, the outer header is used to forward the encapsulated packet through the overlay network from the source VTEP to the destination VTEP. The network layer of the destination EP (e.g., implementing virtual switch 314 that implements the destination VTEP) may then decrypt the packet utilizing the ESP protocol. The network layer of the destination EP passes the encapsulated packet to virtual switch 314 implementing the destination VTEP. The destination VTEP extracts the inner packet, and virtual switch 314 on the destination EP implements security rules (via firewall 312) before forwarding the original packet to the destination virtual machine based on the inner header of the decapsulated original packet.

Figure 4:
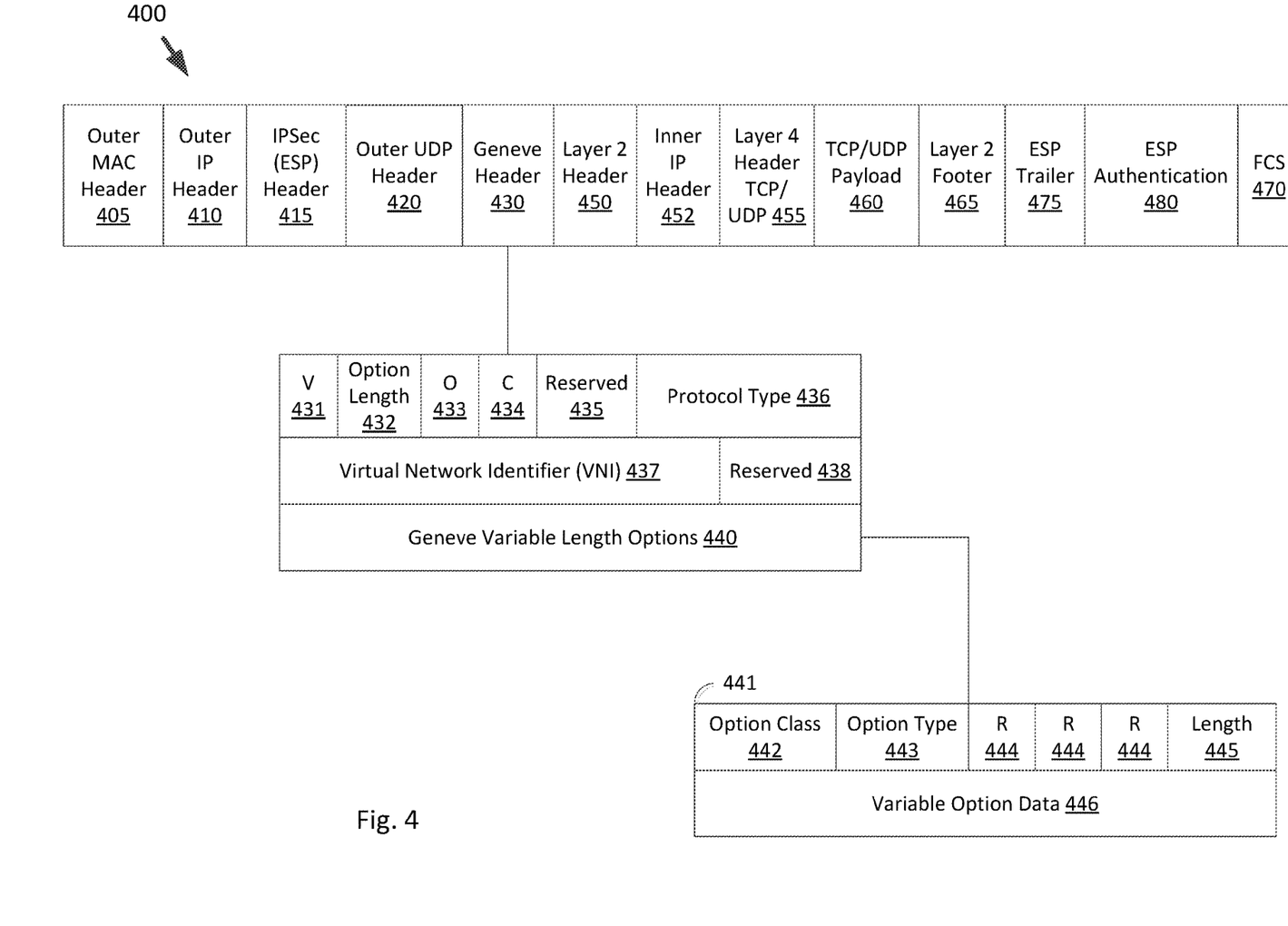
FIG. 4 illustrates an example of a Geneve encapsulated ESP encrypted packet, in accordance with some embodiments.

FIG. 4 illustrates an example of a Geneve encapsulated ESP encrypted packet 400, which is a Layer 2 frame or packet first encapsulated using the Geneve encapsulation protocol and then further encrypted using the ESP protocol in transport mode. Though not shown, a packet encapsulated using Geneve may instead be encapsulated and encrypted using the ESP protocol tunnel mode. As shown in FIG. 4, Geneve encapsulated ESP packet 400 comprises fields including outer MAC header 405, outer IP header 410, outer TCP/UDP header 420, Geneve header 430, and frame check sequence (FCS) 470 added by the Geneve encapsulation. Geneve encapsulated ESP packet 400 further comprises fields IPSec ESP header 415, ESP trailer 475, and ESP authentication 480 added by the ESP protocol in transport mode. The ESP packet 400 further comprises fields Layer 2 header 450, inner IP header 452, Layer 4 header TCP/UDP 455, TCP/UDP payload 460, and Layer 2 footer 465 corresponding to the original Layer 2 frame. IPSec (ESP) header 415, outer MAC header 405, outer IP header 410, outer TCP/UDP header 420, ESP trailer 475, ESP authentication 480, and FCS 470, correspond to IPSec (ESP) header 220, Layer 2 header 205, IP header 210, Layer 4 header TCP/UDP 230, ESP trailer 250, ESP authentication 260, and Layer 2 footer 245, respectively, of FIG. 2.

To encapsulate the original Layer 2 frame using the Geneve encapsulation protocol, a source VTEP receives the Layer 2 frame from a source VM and adds Geneve header 430. Geneve header 430 is a tunnel header that comprises fields including V 431, option length 432, O 433, C 434, Reserved 435, protocol type 436, virtual network identifier (VNI) 437, reserved 438, and variable length option 440. V 431 represents the Geneve header version number. Option length 432 represents the length of the option fields. O 433 is a field that indicates whether the packet as a whole contains a control message or data payload. C 434 indicates if critical options are presents. If this bit is set, tunnel endpoints may parse an options list to interpret any critical options. Reserved 435 is a field that may be zero on transmission and ignored on receipt. Protocol type 436 indicates the type of the protocol data unit appearing after Geneve header 430. VIN 437 is an identifier for a unique element of a virtual network. Reserved 438 is the same as reserved 435.

In variable length options field 440, Geneve header 430 is followed by zero or more Geneve options (e.g., Geneve option 441) in the TLV format. In some embodiments, each option is comprised of a two-byte option header and a variable amount of option data interpreted according to the type. FIG. 4 provides an illustrative example of Geneve option 441 stored in variable length options field 440, according to some embodiments. Geneve option 441 comprises a number of fields including option class 442, option type 443, R 444, length 445, and variable option data 446. Option class 442 is a namespace for option type field 443. A namespace is a set of symbols used to organize option types (e.g., option type 443), such that they may be identified by name. Option type 443 indicates the format of the data contained in variable option data 446. R 444 is an option control flag reserved for future use. Length 445 indicates the length of variable option data field 446. Variable option data field 446, in some embodiments carries actual data and is interpreted according to option type 443.

The source VTEP further adds to the Layer 2 frame outer UDP header 420 that includes a UDP source port of the source VTEP, UDP destination port of the destination VTEP, UDP length, and UDP checksum. In addition, the source VTEP adds outer IP header 410, which includes, among other information, the source IP address of the source VTEP and destination IP address of the destination VTEP. Outer IP header 410 is used by the physical network (e.g., physical network 100) to deliver packets between VTEPs.

Outer MAC header 405 includes a source MAC address of the source VTEP as well as a destination MAC address of the destination VTEP or a next hop destination. At the tail of frame 400 is FCS 470, which is a frame check sequence for error detection. After the source VTEP encapsulates the Layer 2 frame using the Geneve encapsulation protocol, the Geneve encapsulated packet is further encrypted by the IPSec protocol in the network layer of the source EP implementing the source VTEP. Accordingly, the network layer may then add IPSec (ESP) header 415, ESP trailer 475, and ESP authentication 480, which were described above in relation to FIG. 2. The network layer may further modify the outer IP header 410, and encrypt outer TCP/UDP header 420, Geneve header 430, Layer 2 header 450, inner IP header 452, Layer 4 header TCP/UDP 455, TCP/UDP payload 460, Layer 2 footer 465, and ESP trailer 475.

As described above, in some embodiments, Geneve encapsulated ESP packet (e.g., packet 400) is capable of passing the SPI value from the network layer of the destination EP to the virtual switch 314 implementing firewall 312 of the destination EP even after the IPSec ESP header is stripped off by the network layer. More specifically, in some embodiments, the SPI value is saved in variable option data field 446 of a Geneve option 441. In such embodiments, after Geneve encapsulated ESP packet 400 is received by a destination EP, the network layer of the destination EP's kernel decrypts the encrypted portions of the Geneve encapsulated ESP packet 400 and strips off the IPSec ESP header 415. Subsequently, the virtual switch 314 implementing firewall 312 and the destination VTEP receives the remainder of packet 400 and extracts the SPI value from variable option data field 446 of Geneve option 441 in Geneve header 430.

Figure 5:
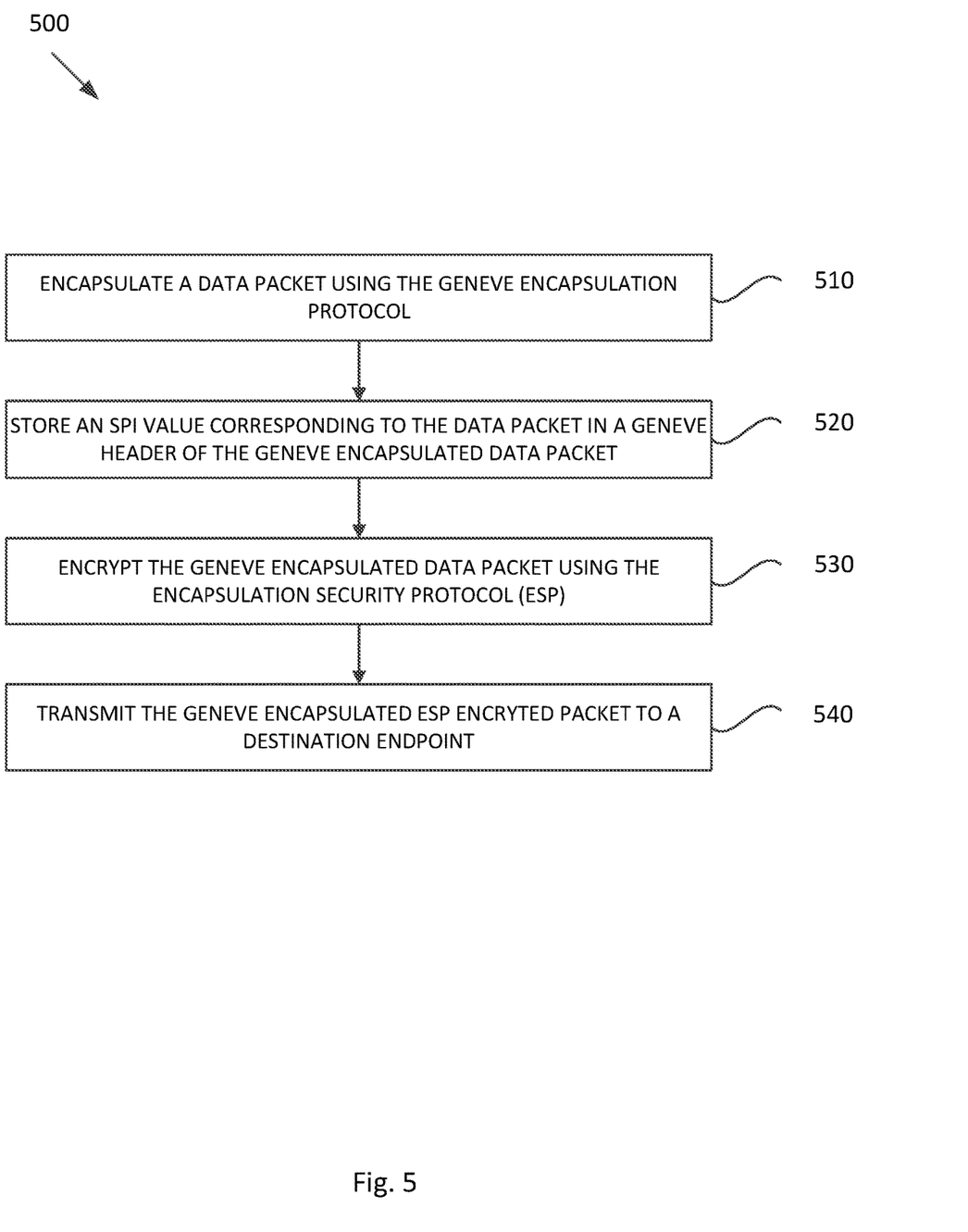
FIG. 5 illustrates example operations for use by a source EP for saving an SPI value corresponding to a data packet in a Geneve header when encapsulating the data packet using the Geneve encapsulation protocols, in accordance with some embodiments.

FIG. 5 illustrates example operations 500 for use by a source EP for saving an SPI value corresponding to a data packet in a Geneve header when encapsulating the data packet using the Geneve encapsulation protocols.

At 510, a source VTEP implemented by a virtual switch of a source EP encapsulates a data packet using the Geneve encapsulation protocol, as described in relation to FIG. 4.

At 520 the source VTEP stores an SPI value (e.g., SPI value 221) corresponding to the data packet in a Geneve header (e.g., Geneve header 430) of the Geneve encapsulated data packet.

At 530 a network layer of the source EP encrypts the Geneve encapsulated data packet using the ESP protocol. The network layer further stores the SPI value in an IPSec ESP header generated as a result of the encryption.

At 540 the network layer of the source EP transmits the Geneve encapsulated ESP encrypted data packet (e.g., data packet 400) to a destination VTEP implemented by a destination EP.

Figure 6:
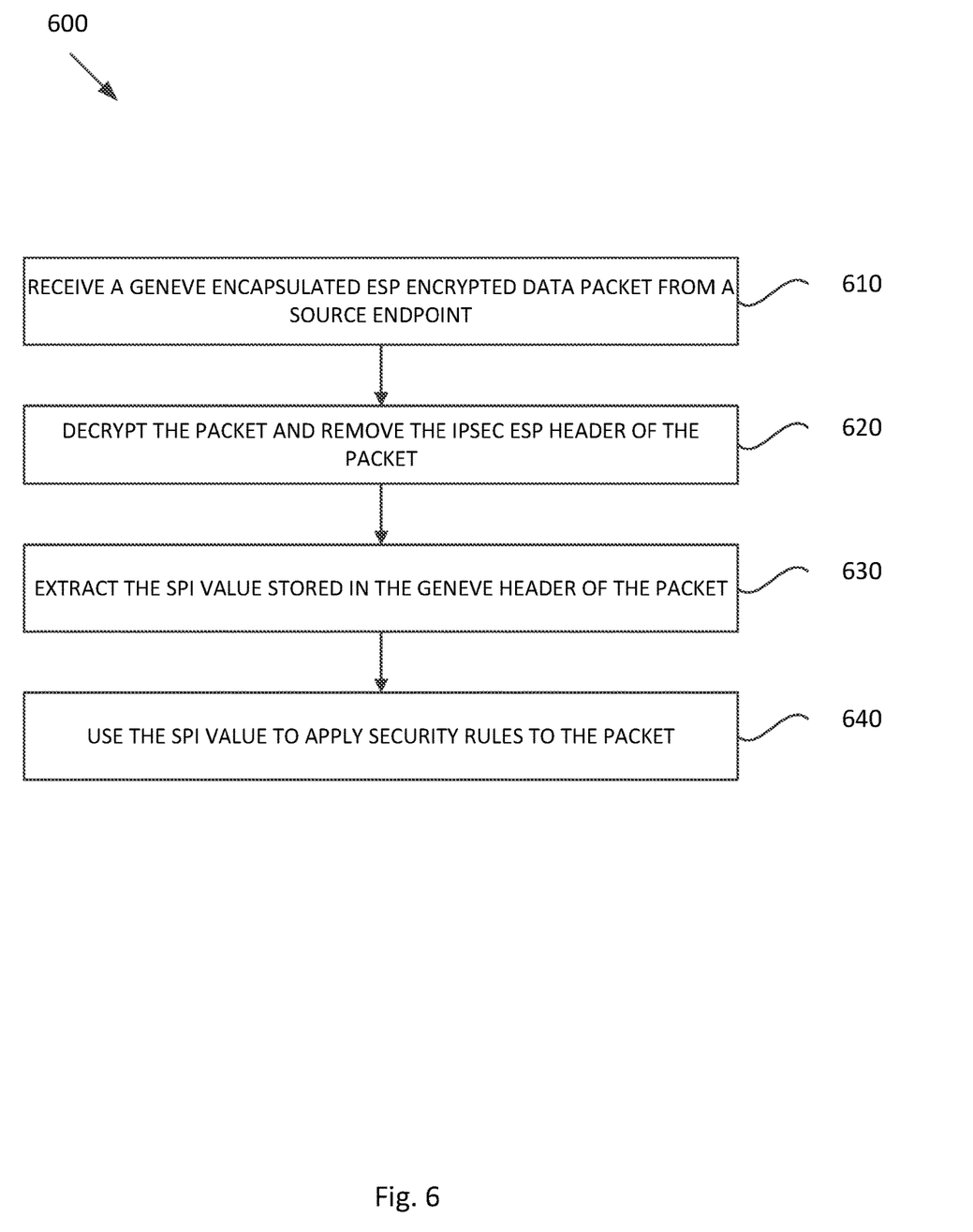
FIG. 6 illustrates example operations for use by a destination EP for decapsulating the Geneve encapsulated ESP encrypted data packet of FIG. 5, received from a source EP, in accordance with some embodiments.

FIG. 6 illustrates example operations 600 for use by a destination EP for decapsulating the Geneve encapsulated ESP encrypted data packet (e.g., data packet 400) received from a source EP.

At 610, the destination EP receives the Geneve encapsulated ESP encrypted data packet (e.g., data packet 400) from a source EP.

At 620, a network layer of the destination EP decrypts (e.g., using the IPSec protocol) the Geneve encapsulated ESP encrypted data packet using an SPI value stored in an IPSec ESP header (e.g., IPSec ESP header 415) of the packet and further removes the IPSec ESP header. Subsequently, the decrypted Geneve encapsulated packet is passed to the virtual switch implementing the destination VTEP and firewall on the destination EP.

At 630, the destination VTEP extracts the SPI value (e.g., SPI value 221) stored in the Geneve header (e.g., Geneve header 430) of the packet.

At 640, the virtual switch implementing the destination VTEP, uses the SPI value to apply security rules to the packet by the firewall implemented by the virtual switch.

It should be noted that the order of certain operations 500 and 600 may be changed, additional operations added, operations removed, etc.

In host machine 300, processing unit(s) may retrieve instructions to execute and data to process in order to execute the processes discussed herein. The processing unit(s) may be a single processor or a multi-core processor in different embodiments. The read-only-memory (ROM) may store static data and instructions that may be utilized by the processing unit(s) and other modules of the electronic system. The permanent storage device, on the other hand, may be a read-and-write memory device. The permanent storage device may be a non-volatile memory unit that stores instructions and data even when the host machine is off. Some embodiments use a mass-storage device (such as a magnetic or optical disk and its corresponding disk drive) as the permanent storage device.

Some embodiments use a removable storage device (such as a floppy disk, flash drive, etc.) as the permanent storage device. Like permanent storage device, the system memory may be a read-and-write memory device. However, unlike permanent storage device, the system memory may be a volatile read-and-write memory, such as a random access memory (RAM). The system memory may store some of the instructions and data that processing unit(s) utilize at runtime. In some embodiments, processes discussed herein are stored in the system memory, the permanent storage device, and/or the read-only memory.

Certain embodiments as described above involve a hardware abstraction layer on top of a host computer. The hardware abstraction layer allows multiple contexts or virtual computing instances to share the hardware resource. In some embodiments, these virtual computing instances are isolated from each other, each having at least a user application running therein. The hardware abstraction layer thus provides benefits of resource isolation and allocation among the virtual computing instances. In the foregoing embodiments, virtual machines are used as an example for the virtual computing instances and hypervisors as an example for the hardware abstraction layer. As described above, each virtual machine includes a guest operating system in which at least one application runs.

It should be noted that these embodiments may also apply to other examples of virtual computing instances, such as containers not including a guest operating system, referred to herein as "OS-less containers" (see, e.g., www.docker.com). OS-less containers implement operating system-level virtualization, wherein an abstraction layer is provided on top of the kernel of an operating system on a host computer. The abstraction layer supports multiple OS-less containers each including an application and its dependencies. Each OS-less container runs as an isolated process in user space on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory and I/O.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Virtualization systems in accordance with the various embodiments may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

We claim:

1. A method for use by a first host machine for exchanging a first Security Parameter Index (SPI) value and a second SPI value with a second host machine, comprising:
encapsulating, by the first host machine, a data packet, using an encapsulation frame format, with an encapsulation header that includes an options field to generate an encapsulated data packet;
storing, by the first host machine, the first SPI value corresponding to the data packet in the options field of the encapsulation header of the encapsulated data packet;
encrypting, by the first host machine, the encapsulated data packet using one or more security protocols to generate an encapsulated encrypted data packet with an added security protocol header and storing the second SPI value in the security protocol header of the encapsulated encrypted data packet, wherein:
the encapsulated encrypted data packet comprises an encrypted portion and an unencrypted portion,
the options field is in the encrypted portion, and
the security protocol header is in the unencrypted portion;
the first SPI value and the second SPI value are the same; and
transmitting, by the first host machine, the encapsulated encrypted data packet to the second host machine.

2. The method of claim 1, wherein the encapsulation frame format comprises a General Network Virtualization Encapsulation (Geneve) frame format.

3. The method of claim 1, wherein the one or more security protocols comprise Internet Protocol Security (IPSec) protocols.

4. The method of claim 1, wherein the one or more security protocols comprise an encapsulating security payload (ESP) protocol.

5. The method of claim 1, wherein the security protocol header comprises an encapsulating security payload (ESP) header.

6. The method of claim 1, wherein the encapsulating is performed by a Virtual Extensible Local Area Network (VXLAN) tunnel endpoint (VTEP) implemented by a virtual switch executed by the first host machine, and wherein the encrypting is performed by a network layer in a kernel space of an operating system executing on the first host machine.

7. The method of claim 1, further comprising:
receiving, by the second host machine, the encapsulated encrypted data packet;
decrypting, by the second host machine, the encapsulated encrypted data packet using the second SPI value stored in the security protocol header to obtain the encapsulated data packet;
removing, by the second host machine, the security protocol header;
extracting, by the second host machine, the first SPI value stored in the options field of the encapsulation header; and
using, by the second host machine, the first SPI value to apply one or more security rules to the data packet.

8. The method of claim 7, wherein the decrypting and the removing are performed by a network layer in a kernel space of an operating system executing on the second host machine.

9. The method of claim 8, wherein the operating system is a Linux operating system implementing a Kernel Virtual Machine (KVM) as a hypervisor.

10. The method of claim 7, wherein the extracting and the using are performed by a virtual switch implemented by the second host machine.

11. A non-transitory computer readable medium comprising instructions to be executed in a computer system comprising a first host machine, wherein the instructions when executed in the computer system perform a method for exchanging a first Security Parameter Index (SPI) value and a second SPI value with a second host machine, the method comprising:
encapsulating, by the first host machine, a data packet, using an encapsulation frame format, with an encapsulation header that includes an options field to generate an encapsulated data packet;
storing, by the first host machine, the first SPI value corresponding to the data packet in the options field of the encapsulation header of the encapsulated data packet;
encrypting, by the first host machine, the encapsulated data packet using one or more security protocols to generate an encapsulated encrypted data packet with an added security protocol header and storing the second SPI value in the security protocol header of the encapsulated encrypted data packet, wherein:
the encapsulated encrypted data packet comprises an encrypted portion and an unencrypted portion, the options field is in the encrypted portion, and
the security protocol header is in the unencrypted portion;
the first SPI value and the second SPI value are the same; and
transmitting, by the first host machine, the encapsulated encrypted data packet to the second host machine.

12. The non-transitory computer readable medium of claim 11, wherein the one or more security protocols comprise an encapsulating security payload (ESP) protocol.

13. The non-transitory computer readable medium of claim 11, wherein the encapsulating is performed by a Virtual Extensible Local Area Network (VXLAN) tunnel endpoint (VTEP) implemented by a virtual switch executed by the first host machine, and wherein the encrypting is performed by a network layer in a kernel space of an operating system executing on the first host machine.

14. The non-transitory computer readable medium of claim 11, wherein the method further comprises:
receiving, by the second host machine, the encapsulated encrypted data packet;
decrypting, by the second host machine, the encapsulated encrypted data packet using the second SPI value stored in the security protocol header to obtain the encapsulated data packet;
removing, by the second host machine, the security protocol header;
extracting, by the second host machine, the first SPI value stored in the options field of the encapsulation header; and
using, by the second host machine, the first SPI value to apply one or more security rules to the data packet.

15. The non-transitory computer readable medium of claim 14, wherein the decrypting and the removing are performed by a network layer in a kernel space of an operating system executing on the second host machine.

16. The non-transitory computer readable medium of claim 14, wherein the extracting and the using are performed by a virtual switch implemented by the second host machine.

17. A computer system comprising a first host machine, comprising:
a non-transitory memory comprising executable instructions; and
a processor in data communication with the memory and configured to execute the instructions to cause the computer system to execute a method for exchanging a first Security Parameter Index (SPI) value and a second SPI value with a second host machine, the method comprising:
encapsulating, by the first host machine, a data packet, using an encapsulation frame format, with an encapsulation header that includes an options field to generate an encapsulated data packet;
storing, by the first host machine, the first SPI value corresponding to the data packet in the options field of the encapsulation header of the encapsulated data packet;
encrypting, by the first host machine, the encapsulated data packet using one or more security protocols to generate an encapsulated encrypted data packet with an added security protocol header and storing the second SPI value in the security protocol header of the encapsulated encrypted data packet, wherein:
the encapsulated encrypted data packet comprises an encrypted portion and an unencrypted portion,
the options field is in the encrypted portion, and
the security protocol header is in the unencrypted portion;
the first SPI value and the second SPI value are the same; and
transmitting, by the first host machine, the encapsulated encrypted data packet to the second host machine.

18. The computer system of claim 17, wherein the security protocol header comprises an encapsulating security payload (ESP) header.

19. The computer system of claim 17, wherein the encapsulating is performed by a Virtual Extensible Local Area Network (VXLAN) tunnel endpoint (VTEP) implemented by a virtual switch executed by the first host machine, and wherein the encrypting is performed by a network layer in a kernel space of an operating system executing on the first host machine.

20. The computer system of claim 17, wherein the method further comprises:
receiving, by the second host machine, the encapsulated encrypted data packet;
decrypting, by the second host machine, the encapsulated encrypted data packet using the second SPI value stored in the security protocol header to obtain the encapsulated data packet;
removing, by the second host machine, the security protocol header;
extracting, by the second host machine, the first SPI value stored in the options field of the encapsulation header; and
using, by the second host machine, the first SPI value to apply one or more security rules to the data packet.

21. The computer system of claim 20, wherein the decrypting and the removing are performed by a network layer in a kernel space of an operating system executing on the second host machine.

22. The computer system of claim 20, wherein the extracting and the using are performed by a virtual switch implemented by the second host machine.

23. A computer system comprising a first host machine, comprising:
means for encapsulating a data packet, using an encapsulation frame format, with an encapsulation header that includes an options field to generate an encapsulated data packet;
means for storing a first Security Parameter Index (SPI) value corresponding to the data packet in the options field of the encapsulation header of the encapsulated data packet;
means for encrypting the encapsulated data packet using one or more security protocols to generate an encapsulated encrypted data packet with an added security protocol header and storing a second SPI value in & the security protocol header of the encapsulated encrypted data packet, wherein:
the encapsulated encrypted data packet comprises an encrypted portion and an unencrypted portion,
the options field is in the encrypted portion, and
the security protocol header is in the unencrypted portion;
the first SPI value and the second SPI value are the same; and
means for transmitting the encapsulated encrypted data packet to the second host machine.

24. The computer system of claim 23, wherein the encapsulating is performed by a Virtual Extensible Local Area Network (VXLAN) tunnel endpoint (VTEP) implemented by a virtual switch executed by the first host machine, and wherein the encrypting is performed by a network layer in a kernel space of an operating system executing on the first host machine.

25. The computer system of claim 23, further comprising:
- means for receiving the encapsulated encrypted data packet;
- means for decrypting the encapsulated encrypted data packet using the second SPI value stored in the security protocol header to obtain the encapsulated data packet;
- means for removing the security protocol header;
- means for extracting the first SPI value stored in the options field of the encapsulation header; and
- means for using the first SPI value to apply one or more security rules to the data packet.

* * * * *